United States Patent [19]
Lamp

[11] Patent Number: 5,315,960
[45] Date of Patent: May 31, 1994

[54] APPARATUS FOR COLLECTING ANIMAL EXCREMENT

[76] Inventor: Henry W. Lamp, 1337 21st Ave., Rock Island, Ill. 61201

[21] Appl. No.: 124,370

[22] Filed: Sep. 20, 1993

Related U.S. Application Data

[63] Continuation of Ser. No. 895,916, Jun. 9, 1992, abandoned.

[51] Int. Cl.⁵ ............................................. A01K 23/00
[52] U.S. Cl. ...................................... 119/95; 119/907; 604/353
[58] Field of Search .................... 119/95, 907, 865; 604/345, 346, 347, 348, 349, 351, 353, 343, 327

[56] References Cited

U.S. PATENT DOCUMENTS

| | | | |
|---|---|---|---|
| 1,389,531 | 8/1921 | Riche | 604/351 |
| 2,310,505 | 2/1943 | Blackburn et al. | 119/95 |
| 2,585,251 | 2/1952 | Kahlert | 119/95 |
| 3,656,459 | 4/1972 | Missud | 119/95 |
| 3,875,903 | 4/1975 | Sarvary | 119/95 |
| 4,103,645 | 8/1978 | Tyler | 119/95 |
| 4,269,148 | 5/1981 | Holley-Donawa | 119/95 |
| 4,846,816 | 7/1989 | Manfredi | 604/353 |

FOREIGN PATENT DOCUMENTS

| | | | |
|---|---|---|---|
| 2626435 | 8/1989 | France | 119/95 |
| 965835 | 8/1965 | United Kingdom | 604/347 |
| 2211388 | 7/1989 | United Kingdom | 119/95 |
| 2238454 | 6/1991 | United Kingdom | 119/95 |

*Primary Examiner*—Gene Mancene
*Assistant Examiner*—Todd E. Manahan
*Attorney, Agent, or Firm*—Rockey, Rifkin & Ryther

[57] ABSTRACT

An improved apparatus for collecting and disposing of animal excrement has an elastic harness assembly attachably secured to the rear portion of an animal, such as a dog, and an excrement container cooperating with, and removable from, the elastic harness assembly. Specifically, the elastic harness assembly has a flexible outer ring member encompassing a rigid inner ring member to which the excrement container is removably attached. The ring members are located about the anal region of the dog and isolated in place by use of fasteners and elastic straps.

4 Claims, 1 Drawing Sheet

APPARATUS FOR COLLECTING ANIMAL EXCREMENT

This is a continuation of copending application Ser. No. 07/895,916, filed on Jun. 9, 1992, now abandoned.

BACKGROUND OF THE INVENTION

1. Field of the Invention

The present invention relates to devices for the convenient disposal of animal excrement, and more specifically to a device that can be isolated to a specific region of the animal.

2. Description of the Related Art

With the joys of pet ownership come the responsibility of "cleaning-up" after the animal has defecated, especially in public places. Many prior inventors have sought various ways to conveniently collect and dispose of animal feces.

Some such inventions involve the use of tools for handling the feces, unhandy in the backyard, let alone, public places. Others include the use of combination device such as a yoke and pouch as disclosed in U.S. Pat. No. 4,502,417 (Jenkins). Many inventors have disclosed the use of a harness worn by the animal and supporting a removable waste receptacle. U.S. Pat. No. 3,656,459 (Missud) discloses a yieldably embracing harness that, depending on the size and movement of the animal, could easily misalign the waste receptacle with respect to the anus. Another invention, U.S. Pat. No. 4,156,402 (Naiztat) discloses a device which is to be tied to the animal to isolate the excrement receptacle.

U.S. Pat. No. 3,817,217 (Matuka, et al) and U.S. Pat. No. 4,444,152 (Berardo) introduce a combination harness and excrement receptacle worn by the animal. The use of buckles and straps to isolate the excrement receptacle in an isolated location about the anus is not only unhandy, but unsightly.

SUMMARY OF THE INVENTION

Accordingly, it is an object of the present invention to provide an apparatus for collecting animal excrement utilizing a combination harness and excrement receptacle while having an improved means for isolating the excrement receptacle about the animal's anus.

Further objects of the invention are to provide an improved apparatus for the collection of animal excrement which is easily fastened and removed from the animal; is relatively inexpensive to manufacture; readily fitted to a variety of dog sizes; can be easily stored in a pocket until use is desired; provided with interchangeable rigid rings to accommodate a variety of excrement receptacle sizes, and provide an improved apparatus which can be easily cleansed for sanitary reasons.

In accordance with the aforementioned objects, the present invention provides an improved apparatus for collecting animal excrement which facilitates the disposal of animal excrement. The improved apparatus is provided with elastic straps which encompass the rear legs of the dog and an adjustable fastener of the Velcro-type to encompass the dog's tail and provide additional tension to the harness assembly. Also provided by the improved apparatus, is a deformable outer ring formed from a material such as rubber, which due to its elasticity and high coefficient of friction, is retained in frictional contact about the area of the anus by means of the elastic straps and fastener. The deformable outer ring encompasses a rigid removable inner ring, formed from a material such as plastic, which has an aperture through which the excrement passes. The removable inner ring is provided with an annular outer lip by which an elastomeric receptacle can be frictionally attached. After the animal has defecated, the elastomeric receptacle can be easily removed from the inner ring and disposed of in a suitable manner.

BRIEF DESCRIPTION OF THE DRAWINGS

A more complete understanding of the invention may be obtained from the detailed description that follows, taken with the accompanying drawings of the embodiment in which.

DETAILED DESCRIPTION OF THE PREFERRED EMBODIMENT

Figure 1:
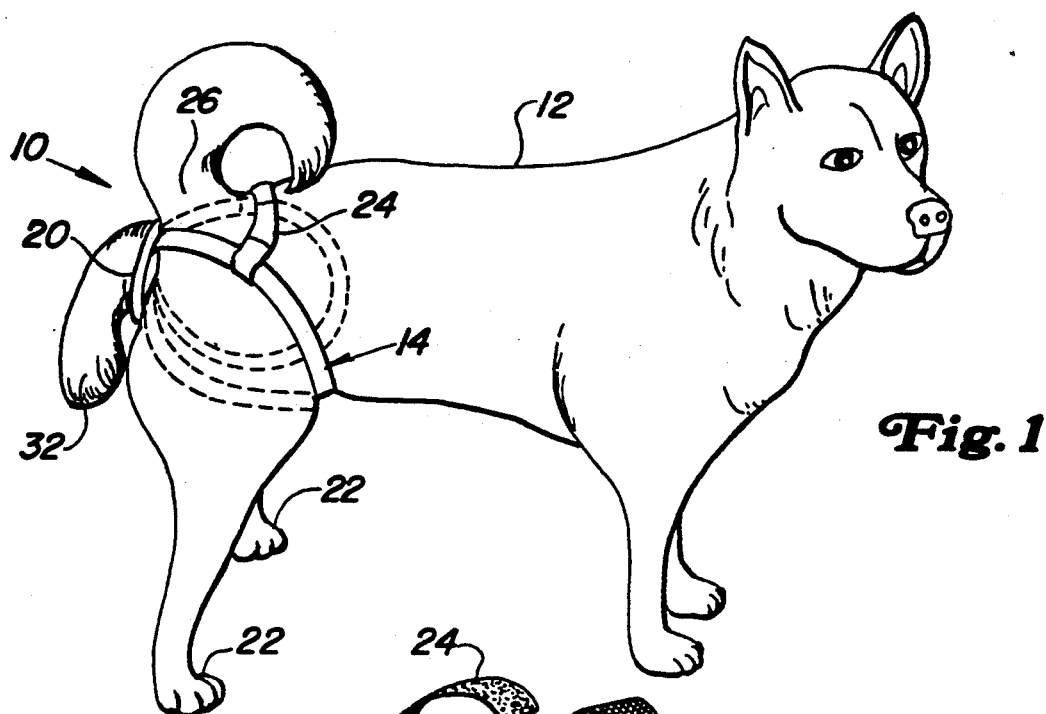
FIG. 1 is a perspective view of a dog employing the use of an improved apparatus for collecting and disposing of animal excrement according to the present invention.

Referring now to FIG. 1, there is shown an apparatus for collecting animal excrement (10) affixed upon the rear haunches of a dog (12). The apparatus for collecting animal excrement (10) includes a harness (14), having at least two elastomeric straps (16) affixed at their respective ends (18) to a deformable outer ring (20). The attachment of the ends (18) to the outer ring (20) provide the straps (16) with a looped configuration as to encompass the rear legs (22) of the dog (12). To further secure the apparatus (10) to the rear haunches of the dog (12) the straps (16) are provided with a variable fastening means (24), such as velcro as shown in FIG. 2, which, when fastened, encompass the base of the dog's trail (26).

Figure 2:
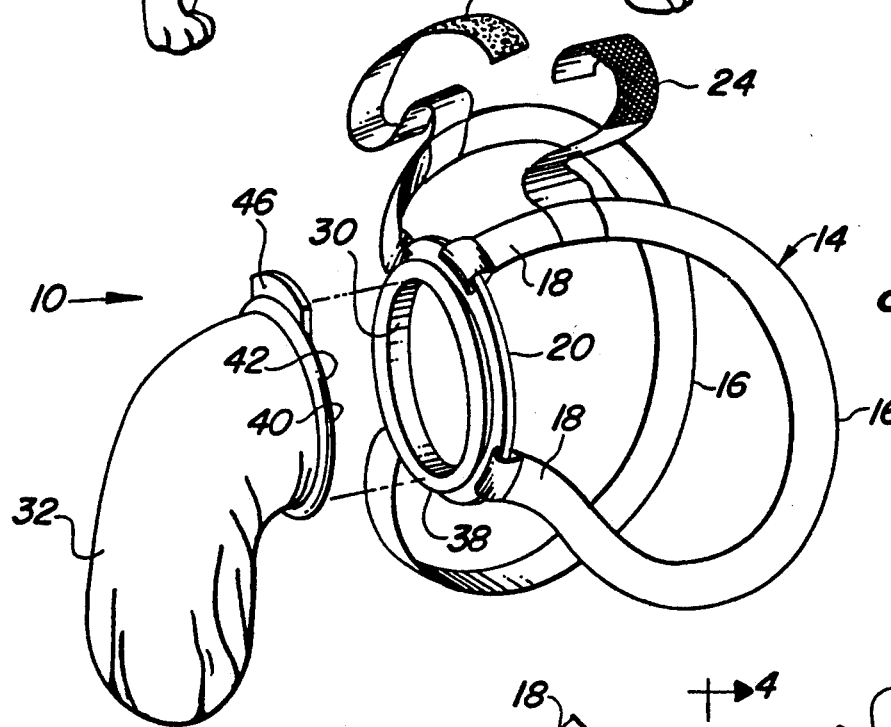
FIG. 2 is an exploded perspective view of the improved apparatus for collecting and disposing of animal excrement removed from the animal.
Figure 4:
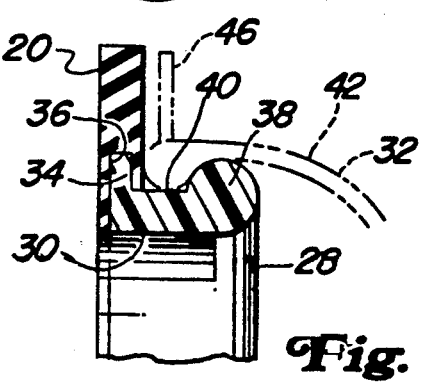
FIG. 4 is a view taken along line 4—4 of FIG. 3.
Figure 3:
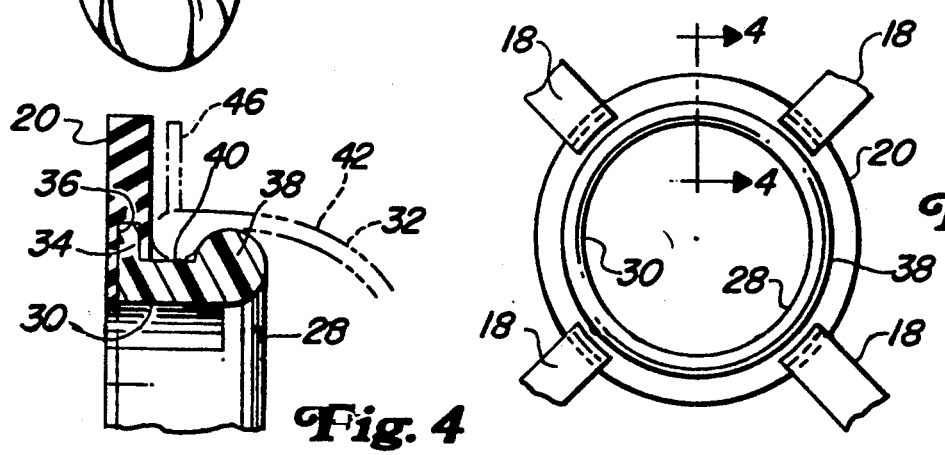
FIG. 3 is a rear view of the improved apparatus depicting the arrangement of the outer and inner rings.

Referring now to FIGS. 2 and 4, the apparatus (10) further comprises a rigid inner ring (28) having an aperture (30) through which excrement can pass from the dog (12) and into an elastomeric excrement receptacle (32). The rigid inner ring (28) is provided with a radially extending flange (34) received by a radial slot (36) provided in the deformable outer ring (20) (See FIG. 4). The rigid inner ring (28) is encompassed by the deformable outer ring (20) and the rings are held in place about the dog's anus by use of the straps (16) and the fastening means 24. Allowing the rigid inner ring (28) to be separable from the deformable outer ring (20) provides the apparatus to accommodate a variety of dog sizes, e.g., small dogs and small excrement receptacles, large dogs and large excrement receptacles. Also provided on the rigid inner ring (28) is an annular outer lip (38) that is slightly larger than an aperture (40) provided at the open end (42) of excrement receptacle (32). The slightly larger size lip is to force a frictional engagement of the excrement receptacle (32) over the annular lip (38) of the rigid inner ring (28). When the excrement receptacle is properly positioned, the excrement receptacle (32) will seat between the annular outer lip (38) and the deformable outer ring (20). This elastomeric material to rigid material contact provides a frictional seal that eliminates seepage of animal excrement due to movement of the dog or weight of the excrement. To assist one in removing or replacing the excrement receptacle

(32) from the harness (14), there is provided a tab (46) (see FIG. 2) laterally extending from the open end (42) of the receptacle (32).

The deformable outer ring (20), preferably composed of rubber, will provide frictional contact between the dog and the outer ring (20).

Although the embodiment depicted is affixed to a dog, it is to be understood that the improved apparatus for collecting animal excrement with appropriate modifications can be affixed to other animals as well.

Various other features of the present invention not specifically enumerated herein will undoubtedly occur to those versed in the art, as will modifications of the embodiment illustrated, all of which may be achieved without departing from the spirit and scope of the invention as defined in the appended claims.

What is claimed is:

1. An improved apparatus for collecting animal excrement comprising a harness having at least two elastomeric straps;
    a deformable outer ring, said deformable outer ring connected to said straps;
    a rigid inner ring, including a first radially extending flange connected to said outer ring, a second radially extending flange forming a recess between said first and said second flanges;
    said rigid ring encompassed by said deformable ring;
    an annular elastomeric receptacle contained by said recess in said rigid ring; and
    said straps holding said rings and said receptacle in place about the tail and haunches of said animal.

2. An improved apparatus for collecting animal excrement in accordance with claim 1, wherein the relaxed diameter of said annular elastomeric receptacle is smaller than the diameter of the second flange on said rigid ring.

3. An improved apparatus for collecting animal excrement in accordance with claim 2, wherein said rigid inner ring is separable from said deformable outer ring.

4. An improved apparatus in accordance with claim 2 wherein said annular elastomeric receptacle includes a tab attached to said receptacle to facilitate removal of said receptacle from said rigid ring.

* * * * *